United States Patent [19]

Caldwell et al.

[11] 4,379,533
[45] Apr. 12, 1983

[54] TRANSPORT AIRPLANE
[75] Inventors: Edward W. Caldwell, Kennesaw; Rollo G. Smethers, Jr., Atlanta, both of Ga.
[73] Assignee: Lockheed Corporation, Burbank, Calif.
[21] Appl. No.: 246,670
[22] Filed: Mar. 23, 1981

Related U.S. Application Data
[63] Continuation of Ser. No. 54,275, Jul. 2, 1979, abandoned.
[51] Int. Cl.³ .............................................. B64D 9/00
[52] U.S. Cl. ..................................... 244/118.1; 244/2; 244/120; 244/137 R; 244/140
[58] Field of Search ........... 244/2, 118, 137 R, 137 P, 244/120, 140, 139, 141

[56] References Cited
U.S. PATENT DOCUMENTS 1,923,963 8/1933 Ayad ................................... 244/140
2,075,042 3/1937 Knew .............................. 244/137 R
2,388,380 11/1945 Bathurst .......................... 244/118.2
2,442,459 6/1948 Fowler .............................. 244/118.2
3,003,717 10/1961 Booker ..................................... 244/2
3,009,672 11/1961 Tharratt .......................... 244/137 R FOREIGN PATENT DOCUMENTS
273940 7/1927 United Kingdom ................ 244/120
467670 6/1937 United Kingdom ............. 244/118.1
911119 11/1962 United Kingdom ............ 244/137 R Primary Examiner—Galen L. Barefoot
Attorney, Agent, or Firm—John J. Sullivan

[57] ABSTRACT

An airplane features one basic airframe capable of carrying passengers or cargo such as intermodal containers or vehicles. It consists of a basic structure containing the cockpit, wings, engines and empennage. The cockpit and empennage portions are connected by an open, flat section (similar to a flatbed truck) on which the payload is placed. The payload thus forms and constitutes the fuselage shape and may be comprised of a passenger pod, cargo containers or outsized and vehicular equipment. Loading and unloading of such payloads is facilitated by a removable forward section to permit front end access and by laterally disposed vertical tails for aft end access.

9 Claims, 11 Drawing Figures

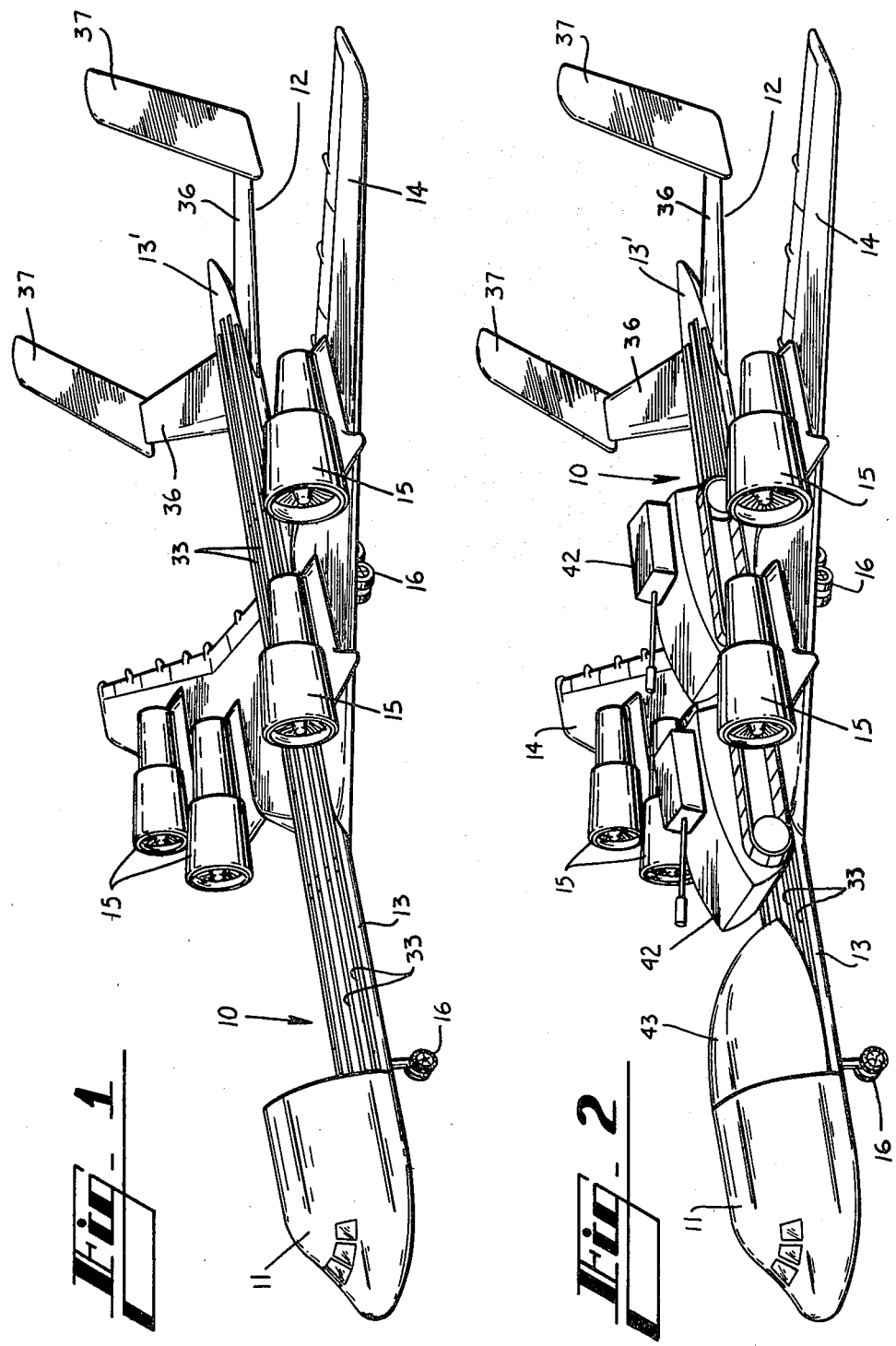

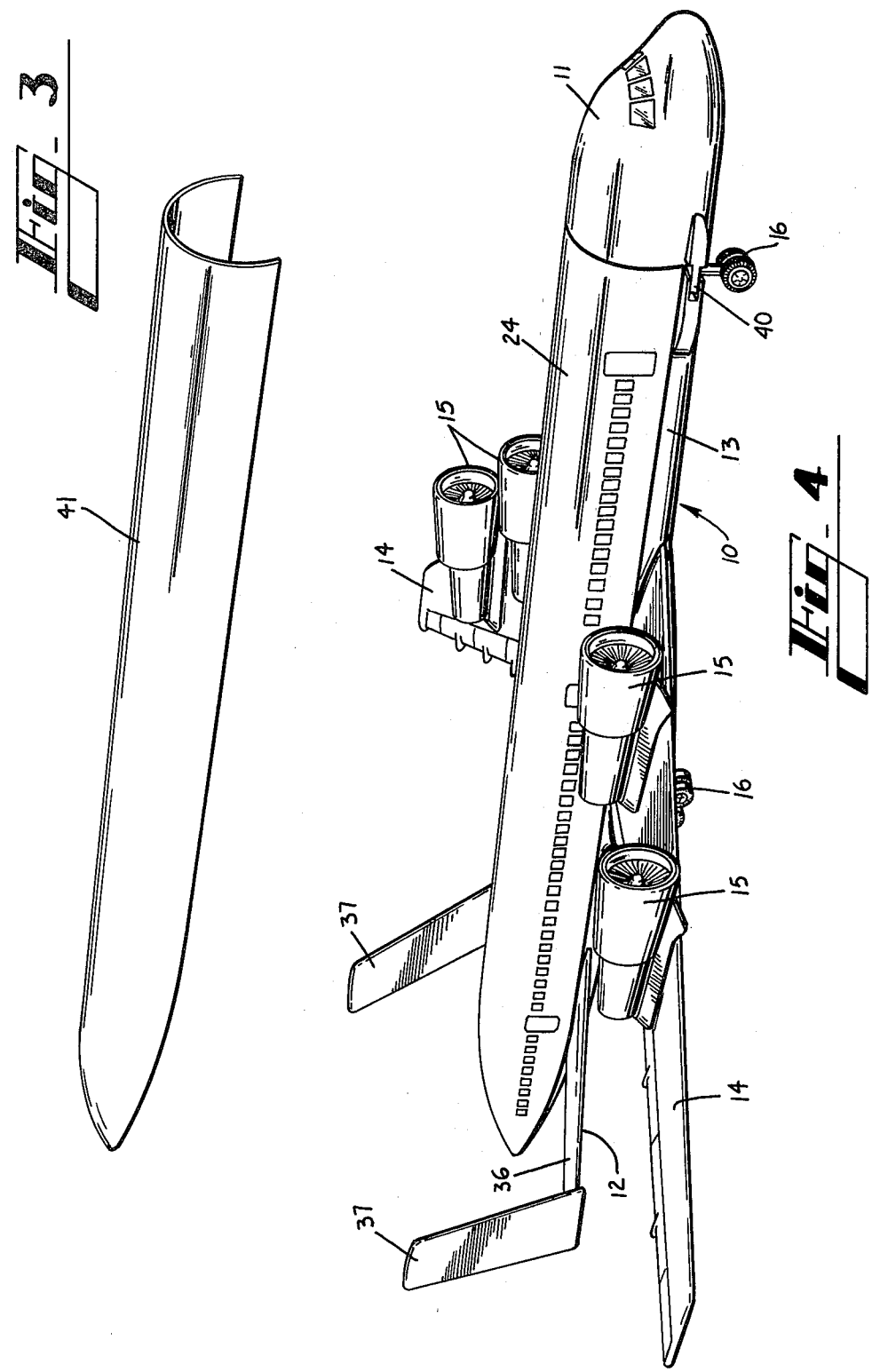

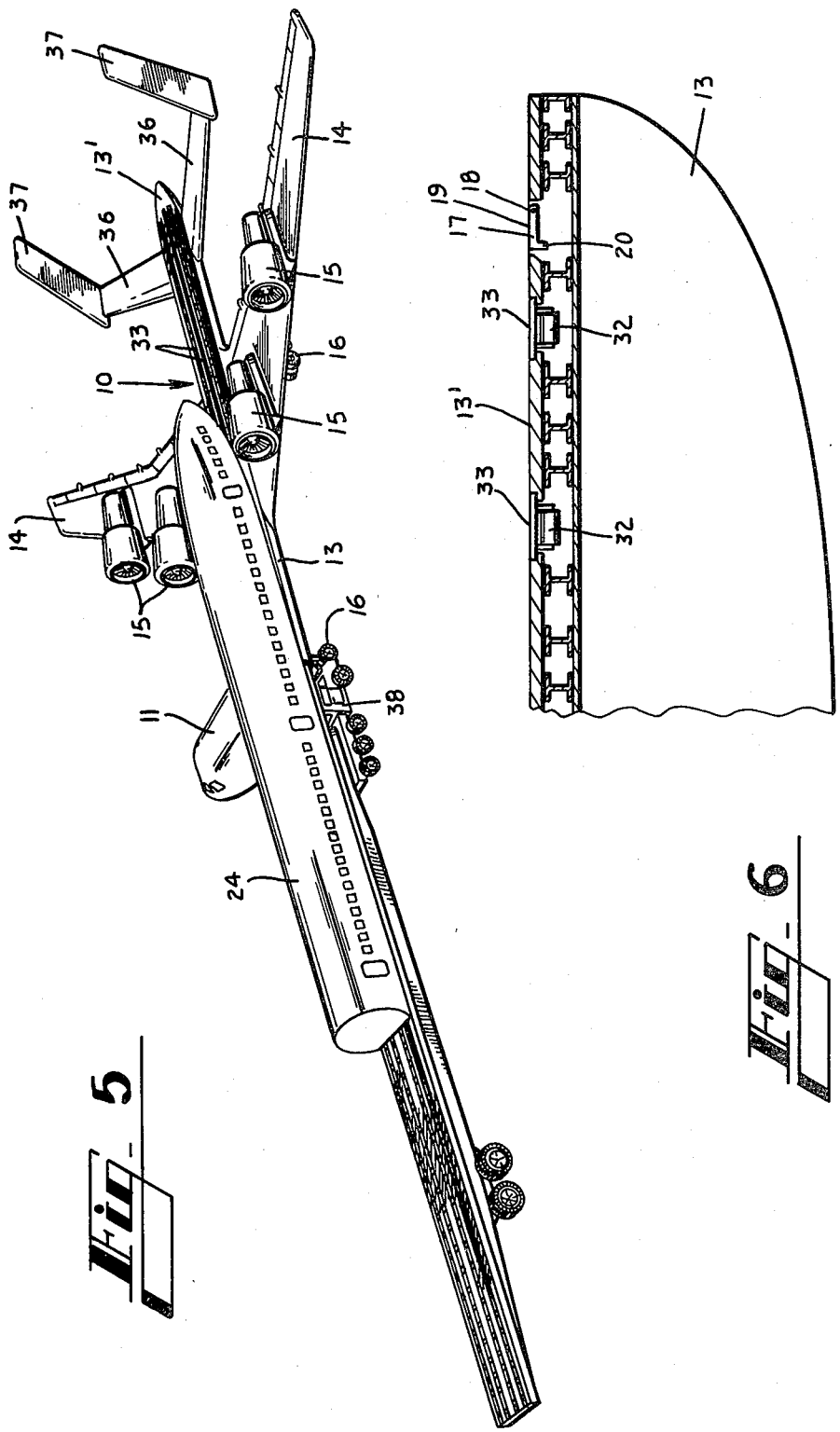

TRANSPORT AIRPLANE

This application is a continuation of application Ser. No. 54,275, filed July 2, 1979, now abandoned.

DESCRIPTION

TECHNICAL FIELD

This invention relates to transport aircraft and more particularly to a transport airplane designed and adapted for rapid conversion to and from passenger and cargo accommodations.

In the operation of transport aircraft it is very important that loading and unloading is accomplished in the shortest possible time so as to minimize the "down" or non-flying time. Also by increasing the utilization rate of these aircraft the operating costs are reduced accordingly.

BACKGROUND

Historically, transport airplanes have generally been specifically designed to haul either cargo, passengers, or outsize cargo. Prior to and during World War II, cargo aircraft were primarily adaptations of passenger airplanes. Even today, most of the commercial cargo is carried on such adaptations or in the belly hold of passenger airplanes.

Military cargo aircraft, such as the C-130 and C-141, are designed to haul cargo and some vehicles —but not outsize cargo such as tanks or bridge launchers. The C-5A can carry all militarily defined outsize cargo and large commercial vehicles. Some later military cargo airplanes can carry some outsize vehicles/equipment, but the price is paid in terms of carrying a large fuselage around for the few times such outsize cargo is actually carried. Airlines may be called upon to serve as CRAF (Civil Reserve Air Fleet) in emergencies. However, being optimized for passenger service, they are generally poor cargo aircraft: the floor is too high off the ground, the doors are narrow, and it is difficult, if not impossible to carry large vehicles.

Passenger airliners also require a relatively long turnaround time at the termination of a specific flight. Many operations not pertinent to flight but necessary for the passenger cabin are performed. The cabin must be cleaned, sanitary facilities emptied, and supplies restocked. Meanwhile, the airplane could have been serviced and been made ready for flight in considerably less time. The point is that an airliner does not earn a return on its investment while sitting on the ground.

Thus, an ideal transport airplane is considered to be one which is designed to utilize one common airframe to carry passengers, cargo, and outsize equipment. While several possible configurational arrangements are perceivable, it has generally been true that the penalty for this versatility has been high acquisition and operation costs.

PRIOR ART

The following typify the closest known prior art as it relates to the subject invention:

British Pat. No. 467,670 issued to Garden, June 14, 1937
U.S. Pat. No. 2,388,380 issued to Bathurst, Nov. 6, 1945
U.S. Pat. No. 2,407,774 issued to Fowler, Sept. 17, 1946.

Garden in the very broadest sense envisions a transport aircraft structure on and around which various types of bodies or fuselages may be built. The essence of the Garden invention is a construction whereby the fuselage floor functions as a ramp facilitating cargo loading and unloading.

Fowler and Bathurst are considered more pertinent to the present invention than is Garden. Each of these patents envisions containers which are specially shaped modules to conform to the adjacent aircraft structure or form the fuselage. Bathurst further contemplates a removable empennage to facilitate on-and off-loading of cargo at the rear.

DISCLOSURE OF INVENTION

The present invention proposes a transport airplane which consists of a basic structure or backbone featuring a platform or flatbed having a nose section including a control cabin at the forward end and terminating in an empennage at the aft end. Wings, landing gear and engines are carried by the flatbed making the backbone flyable. The key feature of this backbone concept is its versatility of operation and flexibility of carriage of various payloads secured to the flatbed. Payloads may be various modules of streamlined shape (such as a passenger module), palletized cargo, containerized (intermodal) cargo, and nonstreamlined i.e. non-aerodynamic configurations such as vehicles, large fuel tanks, highway equipment, or even boats or helicopters, such being carried "in the open" without any fuselage enclosure whereby the outsized cargo forms the airplane's external configuration.

The nose section is hinged to the flatbed to swing to the side to provide clearance for front loading/unloading and the empennage is formed by laterally disposed vertical tails for loading/unloading at that end if desired. Thus payloads are carried on an unobstructed, level surface, extending from just aft of the hinged nose or cabin to the extreme aft end of the fuselage. Loading/unloading of passenger modules, containers or pallets is effected from/to either flatbed trucks or stationary platforms. In the former case, the truck is driven so that the loadbed of the truck is adjacent to the flatbed of the aircraft (with the nose section swung open, if front loading/unloading). In the latter case the airplane is driven close to the stationary platform of the air terminal. In either case a movable ramp may be employed between the airplane flatbed surface and the vehicle or stationary platform.

BRIEF DESCRIPTION OF THE DRAWINGS

FIG. 1 is a perspective view of a transport airplane designed and constructed in accordance with the teachings of this invention showing the basic structure or backbone with its long flat payload-carrying section connecting a nose section with an empennage;

FIG. 2 is a similar view of the same airplane carrying an outsize payload e.g. two Army tanks and showing an aerodynamic fairing at the aft end of the nose section which may be employed, if desired, to reduce drag due to negative air pressure in the wake of the cabin during flight;

FIG. 3 is a perspective view of an alternate fairing which may be employed, if desired, in lieu of the fairing shown in FIG. 2 where other than an outsize payload is carried;

FIG. 4 is a view similar to FIG. 1 of the same airplane carrying a passenger module as the payload;

FIG. 5 is a view similar to FIG. 4 of the same airplane showing the passenger module being removed from the front end onto a surface mobile, the nose section being swung to one side to facilitate such removal;

FIG. 6 is a partial transverse section taken through the flatbed or payload carrying section of the airplane shown in FIG. 1 to show primarily the anti-friction devices and payload restraining mechanisms associated with the floor thereof;

DETAILED DESCRIPTION

Figure 7:
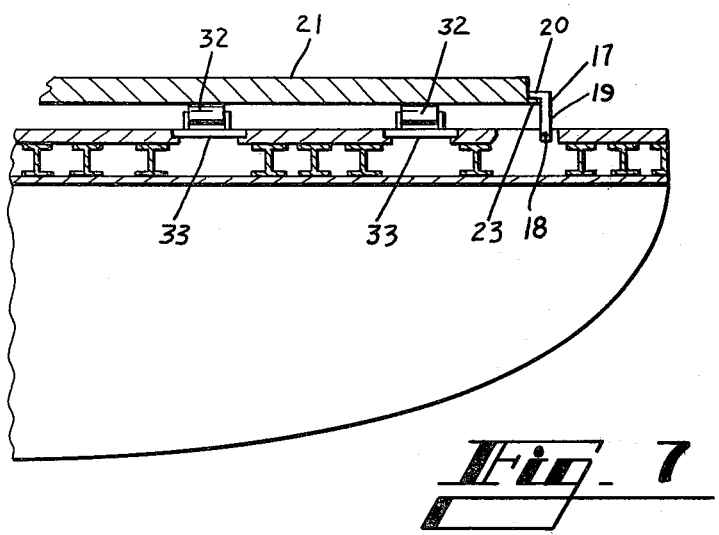
FIG. 7 is a similar section with a pellet on the flatbed floor to show the coaction of the antifriction devices and restraining mechanism therewith.

Referring more particularly to the drawings, 10 designates a basic airplane structure or backbone formed by a forward or nose section 11 which includes the pilot's cabin and an aft section or empennage 12 interconnected by a platform or flatbed section 13. A low wing 14 carrying engines 15 is attached and extends laterally and aft, so-called swept wings, from each side of the flatbed section 13 below the upper surface thereof. As clearly illustrated in the drawings and most notably in FIG. 2 the wings 14 are located approximately midway between the nose section or cabin 11 and the aft airplane extremity. Also carried by the flatbed section 13 is a conventional landing gear arrangement consisting of multiple wheels 16 carried by main bogies mounted on the wings 14 and a nose strut mounted on the forward end of the flatbed 13.

Figure 8:
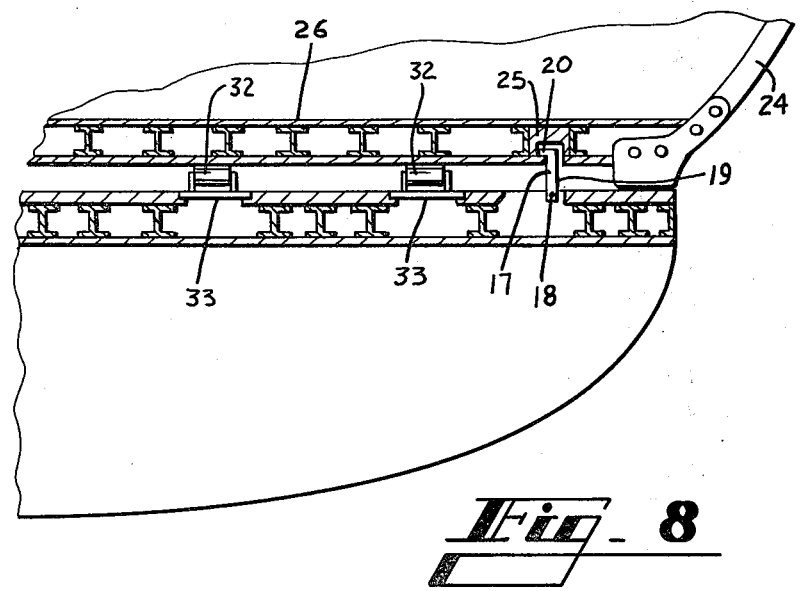
FIG. 8 is a section similar to FIG. 6 with a passenger module like that shown in FIG. 4 on the flatbed floor to show the coaction of the antifriction devices and restraining mechanism therewith.
Figure 9:
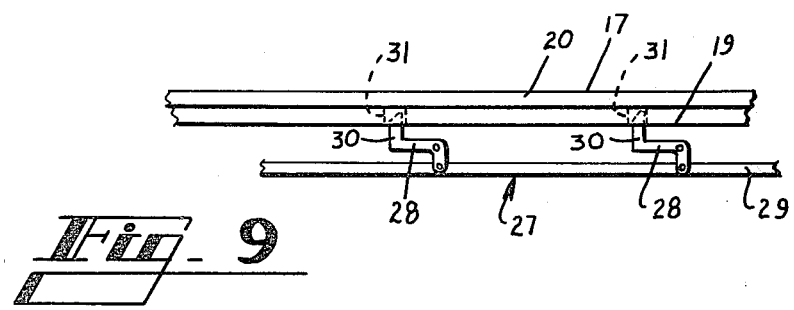
FIG. 9 is a detail of the locking system carried by the passenger module and engageable with the restraining mechanism carried by the flatbed to releaseably secure the former and the latter against all relative longitudinal movement, only a short length of the locking system being shown separate and apart from the associated module and flatbed structures.
Figure 10:
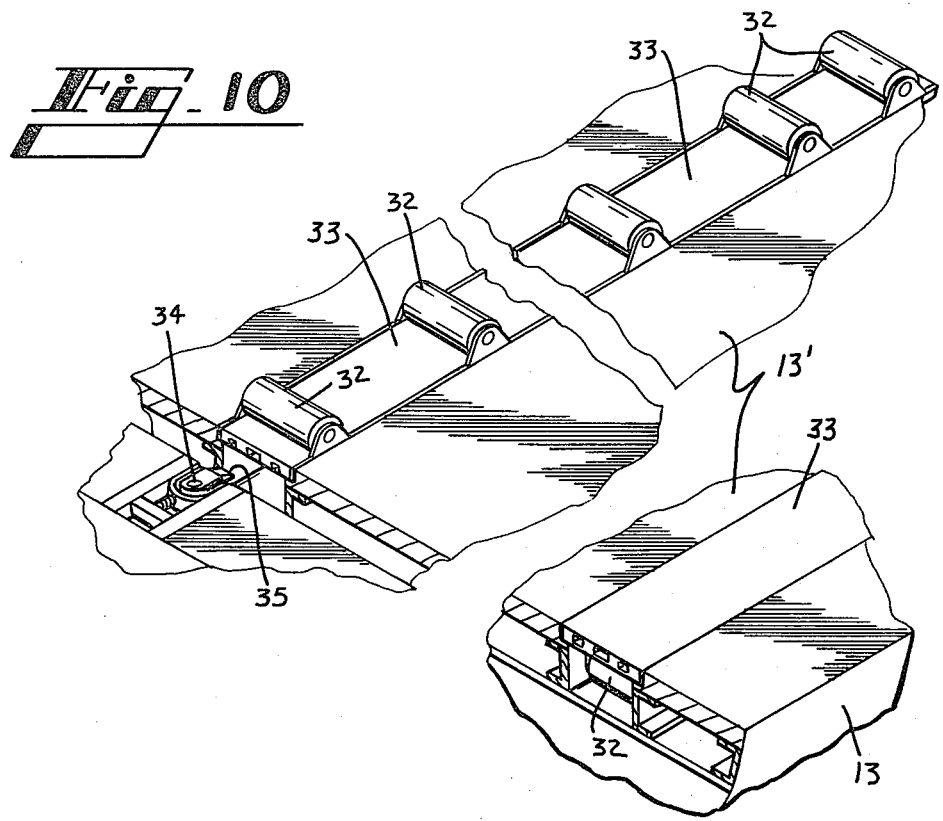
FIG. 10 is a fragmentary detail of one row of the antifriction devices associated with the flatbed floor to show primarily the construction thereof in multiple interconnectable trays which facilitates their assembly and removal and reassembly, the inverted position for storage being also shown at one side.
Figure 11:
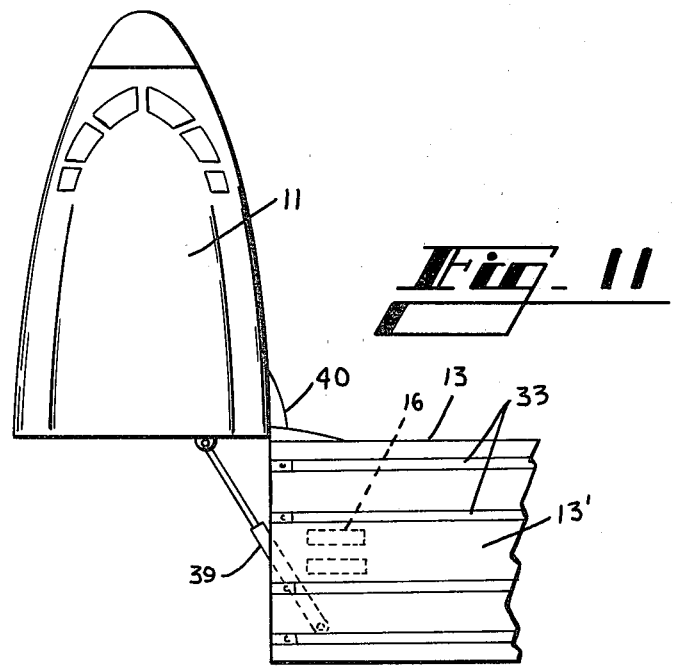
FIG. 11 is a plan view of the forward portion of the airplane showing the nose or cabin section thereof swung to one side as illustrated in FIG. 5 and showing the actuator by which such movement is accomplished.

The upper surface of the flatbed 13 constitutes the floor 13' upon which the payload is adapted to rest and be secured in position against all relative movement. To this end a retractable set of left and right rails 17 is provided in the floor 13' to restrain the payload against relative vertical and lateral movement. Each of these rails 17 extend virtually the length of the floor 13' adjacent each longitudinal side being made up of a number of aligned segments of predetermined length. Each such rail 17 is angular in cross-section being pivotally mounted as at 18 to the floor structure for rotation to and from extreme positions whereby one side surface 19 either lies flush with the adjacent floor surface (FIG. 6) or is disposed vertically (FIGS. 7 and 8). When vertical, the angular end 20 of each rail 17 faces inwardly of the flatbed section 13, i.e., faces the rail 17 on the opposite side of the floor 13'. Thus disposed it overlies and encloses a complemental element carried by the payload.

When the payload is a pallet 21 or a container the complemental payload element is a projection 23 which extends from the base thereof. Supplemental restraint means may also be provided in the form of straps, slings, chocks, etc., all as are customarily employed for this purpose.

In the case of a passenger module 24 being the payload, however, the complemental element is an extruded guide 25 provided in the underside of the module floor 26. In order to prevent relative longitudinal movement between the passenger module 24 and flatbed section 13 a multiple latch and lock system 27 is employed, one such system 27 being associated with each side rail 17. Each of these systems 27 is comprised of a multiplicity of bellcranks 28 all pivotally connected at one end to a common push-pull rod 29 carried by the passenger module 24 and terminating in a finger 30 at the other end engageable in a complemental slot 31 in the associated restraint rail 17.

In any event movement of the payload along the flatbed floor 13' is normally facilitated by antifriction devices or rollers 32 along the upper surface of the floor 13'. Multiple lines of such rollers 32 extend along the length of the floor 13', each line being made up of a number of conveyor trays 33 on which several rollers 32 are mounted. The several trays 33 in each line are interconnected one to the next and to the flatbed floor 13' at the end of that line by spring loaded latches 35 mounted to the floor 13' and on one end of each tray 33 for engagement with complemental means on the adjacent end of the next tray 33. Each tray 33 may be released by the associated latch 34 and inverted to dispose its rollers below the floor surface 13', the upper surface of the tray 33 lying flush with the adjacent floor surface 13' at this time. An actuator 34 on each latch 35 permits the hand operation thereof to release and engage the associated tray 33.

The empennage 13 is formed by a pair of horizontal stabilizers 36 which extend laterally from the flatbed adjacent the aft end thereof to which vertical stabilizers 37 are connected at the outer extremities thereof. This permits on-and off-loading of the payload including aerial delivery without restriction.

To facilitate on-and off-loading of the payload from the front, the nose section 11 is moved to one side permitting appropriate ground equipment such as a truck 38 to be brought into alignment with the flatbed section 13 and a transfer of the payload, shown in FIG. 5 by way of illustration as a passenger module 24, from the truck 38 onto the flatbed 13. Such nose movement is effected by a power actuator 39 operative between the flatbed section 13 and the nose section 11 which are interconnected by a hinge 40. It is noted that all of the elements of the landing gear arrangement 16 are carried by the flatbed section 13 and located at all times aft of the hinged nose section 11 so that the hinge 40 is required to support only the weight of the nose section 11.

Supplemental to the above structure there is provided attachments which may be employed for aerodynamic reasons. Where the size of the payload or cargo permits an enclosure 41 (FIG. 3) may be employed over and around the flatbed section 13 being secured thereto in any conventional manner so as to become in effect an integral part thereof. The external surface of such enclosure is configured to form a smooth and uninterrupted continuation of the adjacent surfaces of the flatbed section 13 and nose section 11 when secured thereto in any conventional manner.

When an outsize load such as for example a United States Army tank 42 is to be carried, an attachment in the form of a fairing 43 may be employed to reduce drag in the wake of the nose section 11. This fairing 43, as is the enclosure 41 when employed, is secured to the nose section 11 and flatbed section 13 in any conventional manner so as to become in effect and integral part thereof. When so secured the fairing 43 serves to extend the external surface of the nose section 11 aft in a smooth and uninterrupted surface which gradually tapers and terminates in a point ahead of the cargo or tank 42.

We claim:

1. A transport airplane formed at the forward end by a control cabin and aft by a basic flyable backbone adapted to removably secure and carry a payload selected from at least one of a variety of payloads of different shapes and sizes thereon including sizes and shapes defining non-aerodynamic configurations extending beyond the limits of structural members forming a part of and carried by said backbone, said backbone comprising:

a flatbed formed by a payload supporting surface planar throughout its length and extending aft from the rear of said cabin adjacent the bottom thereof to the extremity of the airplane and substantially parallel to the ground at all times;

a pair of fixed wings one secured to and extending laterally from each side of said flatbed and below said payload supporting surface, said wings being located approximately midway between said cabin and said aft airplane extremity thereby establishing the location of the center of gravity of the airplane whereby said selected payload center of gravity is located vertically above and substantially aligned with said airplane center of gravity;

at least one engine carried by each said wing; and an empennage formed by a horizontal aerodynamic surface contiguous to and extending laterally from each side of said flatbed below said payload supporting surface and a vertical surface extending upwardly from the outer end of said horizontal surface, said empennage being immovably secured to said flatbed at all times.

2. The airplane of claim 1 including a hinge connection between said cabin and said flatbed and a power actuator operative to swing said cabin to one side of said flatbed.

3. The airplane of claim 2 further including a landing gear arrangement the several elements of which are all located aft of said hinge connection.

4. The airplane of claim 1 including a removable fairing secured to and extending from the aft end of said cabin and tapering to substantially a point medially of the length of said flatbed.

5. The airplane of claim 1 including an enclosure overlying and removably secured to said flatbed and having an external surface configured to form a smooth continuation of the adjacent surfaces of said cabin and said flatbed.

6. The airplane of claim 1 including a passenger module removably secured to said flatbed, said passenger module having an external surface configured to form a smooth continuation of the adjacent surfaces of said cabin and said flatbed.

7. The airplane of claim 1 including longitudinal rails extending along said flatbed each adapted to engage and secure a payload when located on said flatbed.

8. The airplane of claim 1 including a multiplicity of rollers carried by said flatbed adapted to facilitate movement of a payload thereon.

9. The airplane of claim 8 wherein said rollers are mounted on said flatbed for movement to and from extreme positions where they extend above the upper surface of said flatbed and are disposed totally below said upper surface.

* * * * *